United States Patent
Huang et al.

(10) Patent No.: US 7,312,832 B2
(45) Date of Patent: Dec. 25, 2007

(54) SUB-PICTURE IMAGE DECODER

(75) Inventors: Hung-Jen Huang, Hsinchu (TW); Wen-Kuan Chen, Jhudong Township, Hsinchu County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 490 days.

(21) Appl. No.: 10/833,067

(22) Filed: Apr. 28, 2004

(65) Prior Publication Data

US 2004/0218097 A1   Nov. 4, 2004

(30) Foreign Application Priority Data

Apr. 29, 2003 (TW) .............................. 92109988 A

(51) Int. Cl.
*H04N 5/44* (2006.01)

(52) U.S. Cl. ...................... 348/561; 348/564; 348/563; 348/468

(58) Field of Classification Search ........ 348/561–568, 348/672, 446, 581, 582, 588, 468
See application file for complete search history.

(56) References Cited

U.S. PATENT DOCUMENTS

| | | | | | |
|---|---|---|---|---|---|
| 5,204,748 | A | * | 4/1993 | Lagoni | 348/565 |
| 5,359,369 | A | * | 10/1994 | Izawa et al. | 348/672 |
| 5,978,046 | A | * | 11/1999 | Shintani | 348/589 |
| 6,226,040 | B1 | * | 5/2001 | Kuo et al. | 348/446 |
| 7,062,153 | B2 | * | 6/2006 | Suda | 386/95 |

\* cited by examiner

*Primary Examiner*—M. Lee
(74) *Attorney, Agent, or Firm*—Bacon & Thomas, PLLC

(57) ABSTRACT

A sub-picture image decoder is disclosed, which essentially uses a sub-picture buffering unit to temporarily store at least one sub-picture data, an adjustment unit to store plural types of adjusting parameters, a control unit to compare the sub-picture data with the sub-picture display formats stored in a look-up table. The control unit receives adjusting signal generated by an input unit to retrieve corresponding adjusting parameter and adjust the corresponding sub-picture image for display according to the adjusting parameter.

7 Claims, 3 Drawing Sheets

Provide you the highest quality of picture

FIG. 3B

Provide you the highest quality of picture

FIG. 3A

SUB-PICTURE IMAGE DECODER

BACKGROUND OF THE INVENTION

1. Field of the Invention

The present invention relates to an image decoder and, more particularly, to a sub-picture image decoder.

2. Description of Related Art

Currently, as shown in FIG. 1, a DVD player already can display bilingual subtitles at the same time, but the subtitles are generally displayed at fixed positions, which easily covers important background or the like and thus prevents a viewer's eyes from understanding related image messages. In addition, the player displays the subtitles with fixed size fonts. This makes a remote viewer's eyes blur and fatigue because the subtitles cannot be adjusted to obtain appropriate size fonts. Moreover, the brightness of the subtitles on display cannot be separately adjusted. As such, a viewer may find that, for example, when the background is changed into a brightness similar to the brightness of the subtitles, the subtitle image is mixed with the background image.

Therefore, it is desirable to provide an improved sub-picture decoder to mitigate and/or obviate the aforementioned problems.

SUMMARY OF THE INVENTION

An object of the present invention is to provide a sub-picture image decoder, which can zoom in or out any display subtitle area.

Another object of the present invention is to provide a sub-picture image decoder, which can adjust the position of any display subtitle area.

A further object of the present invention is to provide a sub-picture decoder for DVD video, which can adjust the brightness of any display subtitle area.

To achieve the objects, the sub-picture image decoder of the present invention includes: a sub-picture buffering unit, to receive sub-picture data and temporarily store the sub-picture data; an adjustment unit, pre-stored with plural types of adjusting parameter, each having at least one corresponding adjusting parameter; a look-up table, to provide a plurality of sub-picture display formats that are compared with the sub-picture data to obtain a sub-picture image; an input unit, to generate an adjusting signal; and a control unit, to retrieve the corresponding adjusting parameter based on the adjusting signal, so as to adjust the sub-picture image based on the adjusting parameter for display.

Other objects, advantages, and novel features of the invention will become more apparent from the following detailed description when taken in conjunction with the accompanying drawings.

BRIEF DESCRIPTION OF THE DRAWINGS

FIGS. 3A and 3B are schematic views of the operation of FIG. 2.

DETAILED DESCRIPTION OF THE PREFERRED EMBODIMENT

Figure 1:
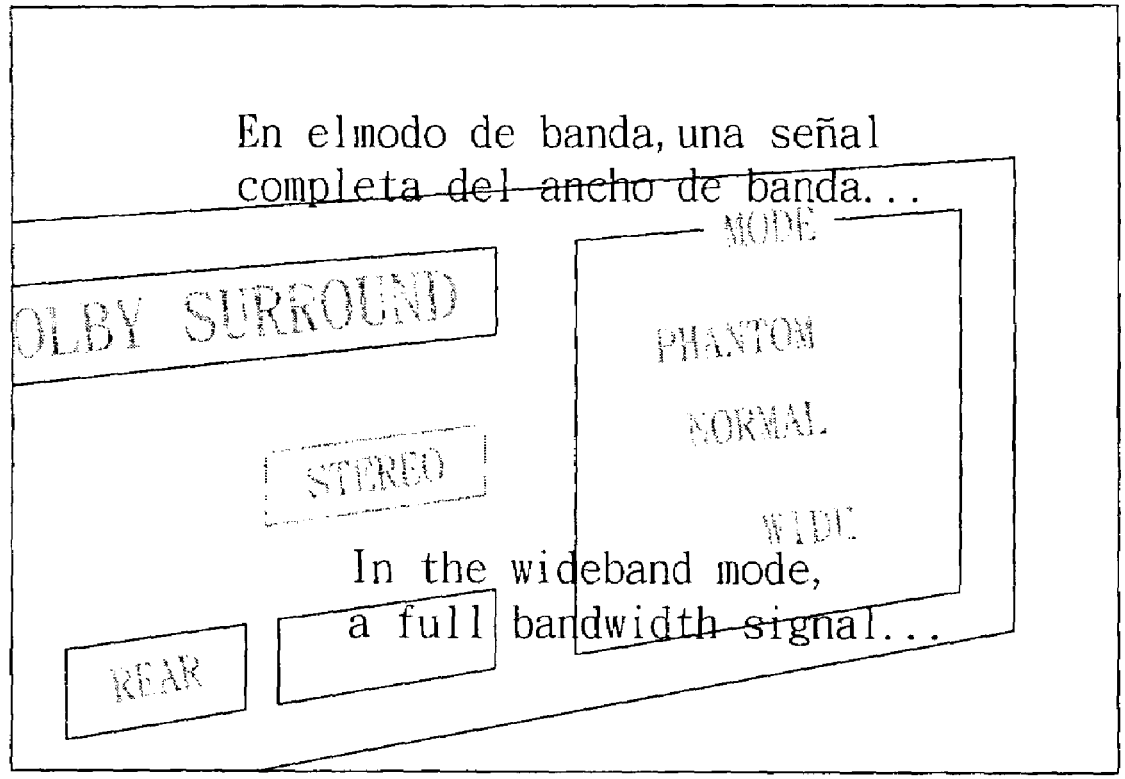
FIG. 1 is a schematic view of a playing frame of a typical DVD player.
Figure 2:
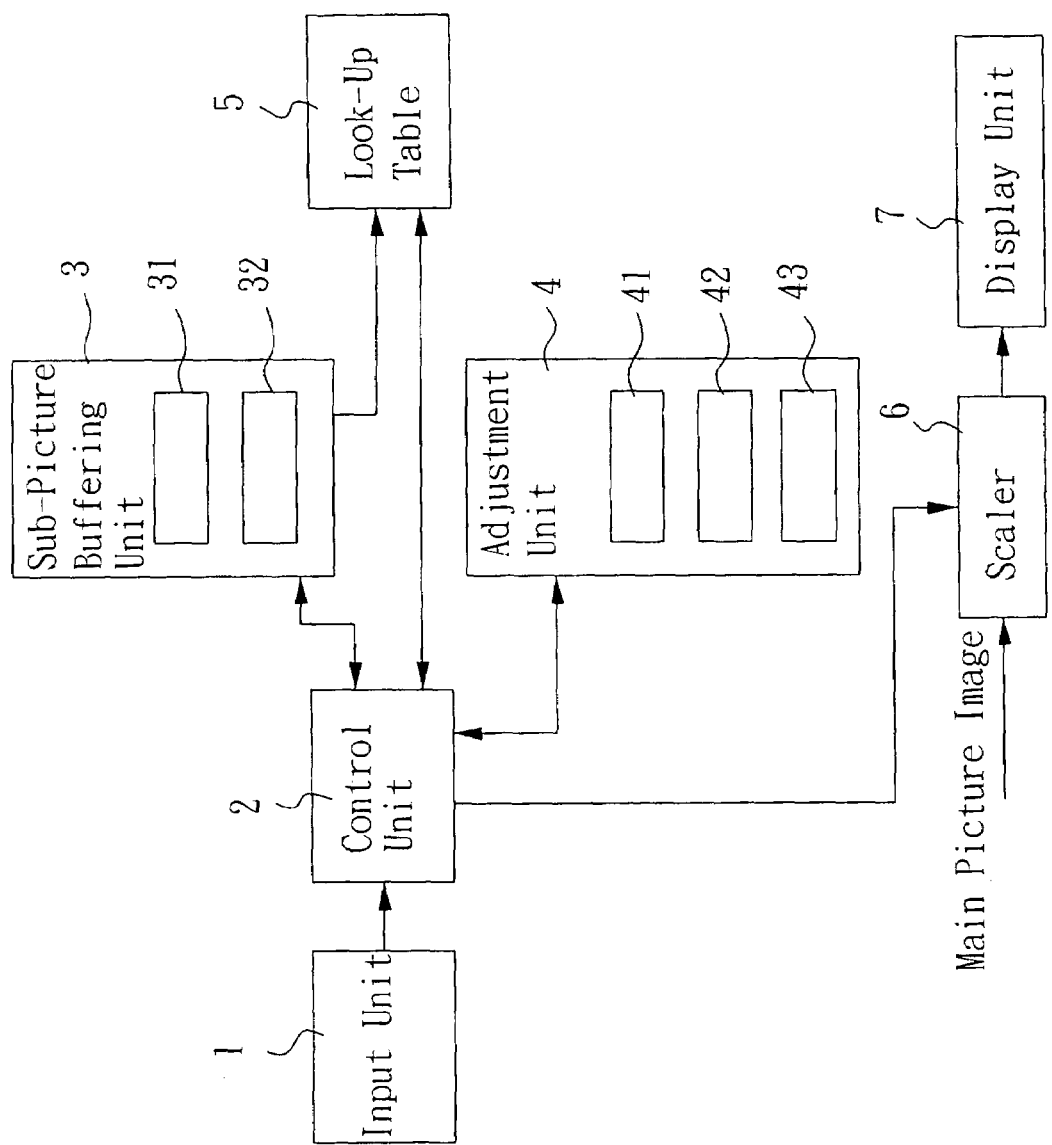
FIG. 2 is a functional block diagram of an embodiment of the present invention.

An embodiment of the present invention is given by a language learning machine. With reference to FIG. 2, a functional block structure is shown. The structure includes an input unit 1, a control unit 2, a sub-picture buffering unit 3, an adjustment unit 4, a look-up table 5, a scaler 6 and a display unit 7. The look-up table is stored in a memory unit (not shown). In this embodiment, the input unit 1 is preferably a set of keys on a display panel to generate adjusting signal for main picture or sub-picture. In this embodiment, adjusting signal for sub-picture is described as follows.

The input unit 1 is electrically connected to the control unit 2. The control unit 2 is connected to the sub-picture buffering unit 3, the adjustment unit 4, the memory unit stored with the look-up table 5, and the scaler 6, respectively. The scaler 6 is connected to the display unit 7.

The sub-picture buffering unit 3 has a first buffer 31 and a second buffer 32 respectively to store a first sub-picture data (which can be a first language subtitle, e.g., English) and a second sub-picture data (which can be a second language subtitle, e.g., Chinese). The adjustment unit 4 has three registers 41, 42, 43, respectively to store three types of adjusting parameter including sub-picture position adjusting parameter, sub-picture zoom adjusting parameter and sub-picture brightness adjusting parameter. Each type of adjusting parameter has multiple coefficients. The look-up table 5 has a plurality of sub-picture display formats. In this embodiment, the sub-picture display formats are in text.

Before the input unit 1 sends the sub-picture adjusting signal to the control unit 2, the control unit 2 compares both the first sub-picture data and the second sub-picture data stored in the sub-picture buffering unit 3 with the sub-picture display formats in the look-up table 5, to accordingly find corresponding first sub-picture image and second sub-picture image to output to the scaler 6. The scaler 6 combines received main picture image and the sub-picture images and then outputs to the display unit 7 for display.

When the input unit 1 sends the sub-picture adjusting signal to the control unit 2, the control unit 2 selects an adjusting parameter (the sub-picture position adjusting parameter, the sub-picture zoom adjusting parameter or the sub-picture brightness adjusting parameter) according to a sub-picture adjusting signal, such that the sub-picture image is adjusted by the adjusting parameter (that first compares the sub-picture data with the sub-picture display formats in the look-up table). For example, if a sub-picture position adjusting parameter is selected, the control unit 2 adjusts the first or second sub-picture image according to position offset or offset address represented by the sub-picture position adjusting parameter, thereby preventing the sub-picture image from masking the main picture image.

If a sub-picture zoom adjusting parameter is selected, the control unit 2 adjusts the first or second sub-picture image according to zoom in or out multiple represented by the sub-picture zoom adjusting parameter. If a sub-picture brightness adjusting parameter is selected, the control unit 2 adjusts brightness of the first or second sub-picture image according to brightness parameter represented by the sub-picture brightness adjusting parameter.

After the above adjustment, the control unit 2 sends the sub-picture image to the scaler 6, to combine to the main picture image and output to the display unit 7. FIG. 3A shows a schematic view of normal sub-picture image subtitles. FIG. 3B shows a schematic view of zoom-in sub-picture image subtitles.

In view of the foregoing, it is known that the invention uses the adjustment unit to store the plurality of adjusting parameters such that the control unit selects an adjusting parameter according to the sub-picture adjusting signal generated by the input unit and thus adjusts corresponding sub-picture image using the adjusting parameter selected. Therefore, a display subtitle area (sub-picture) can be zoomed in or out, and position and brightness of the display subtitle area can be adjusted.

Although the present invention has been explained in relation to its preferred embodiment, it is to be understood that many other possible modifications and variations can be made without departing from the spirit and scope of the invention as hereinafter claimed.

What is claimed is:

1. A sub-picture image decoder for use in a language learning machine, comprising:
   a sub-picture buffering unit, having a first buffer and a second buffer to receive first sub-picture data and second sub-picture data respectively and temporarily store the first sub-picture data and the second sub-picture data respectively, wherein the first sub-picture data and the second sub-picture data correspond to language sub-titles of different languages;
   an adjustment unit, pre-stored with plural adjusting parameters, each said adjusting_parameter having at least one adjusting parameter value;
   a look-up table, to provide a plurality of sub-picture display formats corresponding to the first sub-picture data and the second sub-picture data to obtain a first sub-picture image and a second sub-picture image on a main picture image;
   an input unit, to generate an adjusting signal; and
   a control unit, to retrieve the adjusting parameter value corresponding to the adjusting signal from the adjustment unit, so as to adjust the first sub-picture image and the second sub-picture image based on the adjusting parameter value for displaying the first sub-picture image and the second sub-picture image at the same time and in different positions.

2. The sub-picture image decoder as claimed in claim 1, wherein the adjustment unit includes a plurality of registers, each said register storing an adjusting parameter.

3. The sub-picture image decoder as claimed in claim 2, wherein each register stores a plurality of adjusting parameter values from one of the adjusting parameters.

4. The sub-picture image decoder as claimed in claim 1, wherein the plurality of adjusting parameters includes a sub-picture position adjusting parameter, a sub-picture zoom adjusting parameter and a sub-picture brightness adjusting parameter.

5. The sub-picture image decoder as claimed in claim 1, wherein the look-up table is stored in a memory unit.

6. The sub-picture image decoder as claimed in claim 1, further comprising a scalar unit to combine the first sub-picture image and the second sub-picture image with the main picture image for output to a display unit, wherein the first sub-picture image and the second sub-picture image are displayed in text and the main picture image is displayed in video.

7. The sub-picture image decoder as claimed in claim 1, wherein the plurality of sub-picture display formats are in text.

* * * * *